(12) United States Patent
Cox

(10) Patent No.: US 12,487,055 B2
(45) Date of Patent: Dec. 2, 2025

(54) SIGHT-ASSIST SYSTEM FOR A FIREARM, AND RELATED METHODS AND COMPONENTS

(71) Applicant: Dan Cox, North Logan, UT (US)

(72) Inventor: Dan Cox, North Logan, UT (US)

( * ) Notice: Subject to any disclaimer, the term of this patent is extended or adjusted under 35 U.S.C. 154(b) by 420 days.

(21) Appl. No.: 18/248,504

(22) PCT Filed: Oct. 15, 2021

(86) PCT No.: PCT/US2021/055182
§ 371 (c)(1),
(2) Date: Apr. 10, 2023

(87) PCT Pub. No.: WO2022/081972
PCT Pub. Date: Apr. 21, 2022

(65) Prior Publication Data
US 2023/0375307 A1    Nov. 23, 2023

Related U.S. Application Data

(60) Provisional application No. 63/092,077, filed on Oct. 15, 2020.

(51) Int. Cl.
*F41G 1/38* (2006.01)
*F41G 3/26* (2006.01)
*F41G 11/00* (2006.01)
*F41J 5/10* (2006.01)

(52) U.S. Cl.
CPC ............. *F41G 3/2611* (2013.01); *F41G 1/38* (2013.01); *F41G 11/004* (2013.01); *F41J 5/10* (2013.01)

(58) Field of Classification Search
CPC . F41G 3/165; F41G 1/473; F41G 1/30; F41G 3/08; F41G 3/26; F41G 1/38
See application file for complete search history.

(56) References Cited

U.S. PATENT DOCUMENTS 3,911,451 A * 10/1975 Vockenhuber ............ F41G 1/30
396/432
2008/0039962 A1    2/2008 McRae
2011/0280040 A1   11/2011 Schick
(Continued)

FOREIGN PATENT DOCUMENTS

WO    2011/022541    2/2011

*Primary Examiner* — Jonathan C Weber
(74) *Attorney, Agent, or Firm* — John Janeway; Janeway Patent Law, PLLC

(57) ABSTRACT

A system for assisting one's vision while aiming a firearm, includes a scope (but may also not include a scope) that is operable to capture light from an object downfield, and an optical collar that is operable to divert some or all of the light captured, and generate an image of the object. The scope has a first end and a second end. The first end captures light from the object located downfield from the first end, and looking through the second end, one receives the light captured by the first end, and generates an image of the object from the captured light. The optical collar includes a camera operable to generate an image from light that the camera receives, a beam-splitter optically aligned with the second end of the scope and operable to reflect a portion of the light captured by the scope's first end toward the camera, and a display operable to show the image generated by the camera from the light that the camera receives.

23 Claims, 6 Drawing Sheets

(56) References Cited

U.S. PATENT DOCUMENTS

| | | |
|---|---|---|
| 2012/0102808 A1 | 5/2012 | Matthews et al. |
| 2016/0061568 A1 | 3/2016 | Crispin |
| 2017/0010070 A1 | 1/2017 | Maryfield et al. |
| 2017/0097209 A1 | 4/2017 | Portoghese et al. |

* cited by examiner

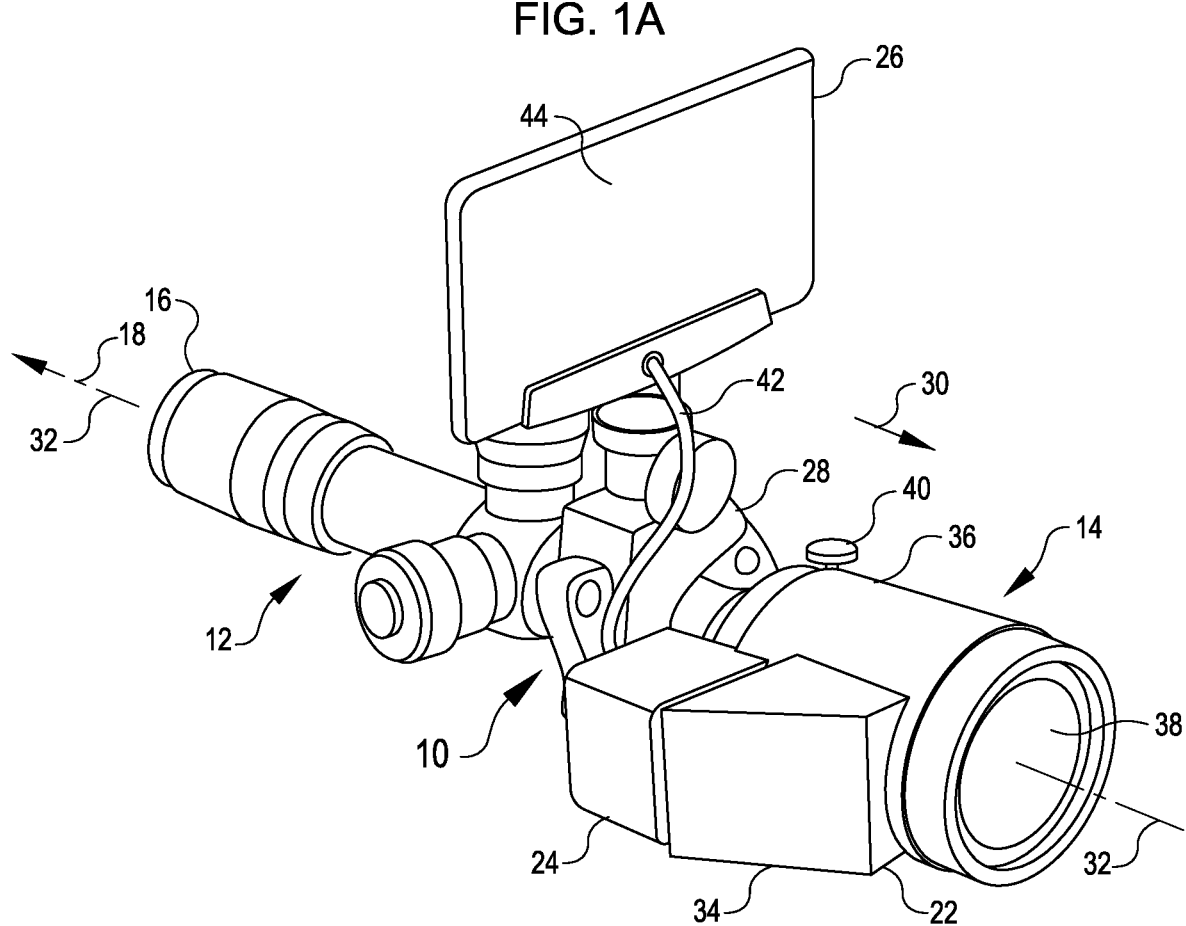

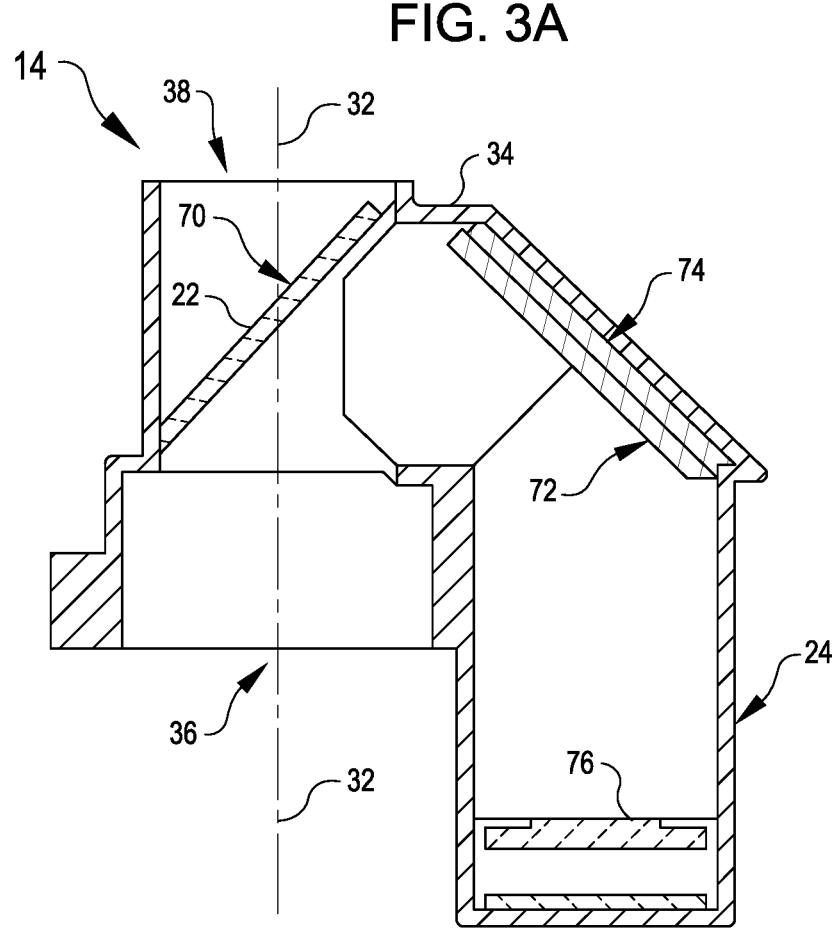

SIGHT-ASSIST SYSTEM FOR A FIREARM, AND RELATED METHODS AND COMPONENTS

CROSS REFERENCE TO RELATED APPLICATIONS

This application claims priority to U.S. provisional patent application 63/092,077 filed 15 Oct. 2020 via PCT patent application PCT/US21/55182 filed 15 Oct. 2021. This application incorporates all that each of these previously filed patent applications teaches and discloses by this reference.

BACKGROUND

Hunting and shooting, whether with pistols, rifles or shotguns, is a lot of fun. With much practice one can become a good marksman, often making a shot that is very difficult because of the distance involved or the ambient conditions like the wind and/or change in elevation. Recording such difficult shots helps the shooter remember the thrill of making the shot, and recording practice shots provides valuable feedback for improving one's marksmanship. When hunting, many hunters enjoy recording their hunt to remember the challenge of getting to the climax of the hunt, and to remember the thrill of the climax itself—the shot. This is especially true for big-game hunters. The hunt itself may be an activity on the hunter's bucket list, so recording the hunt provides the hunter a way to relive the experience.

Unfortunately, most recordings of hunts or shots on the range are made by a camera that is operated by a friend or guide. This can be problematic because the picture and/or video is shot from a perspective other than the shooter's perspective. So, the picture and/or video doesn't show what the shooter sees while the shooter prepares for and takes his/her shot, and thus loses much of what the shooter feels during the preparation and the taking of the shot. Sometimes, the friend or guide taking the picture and/or video misses the shooter's shot because he gets distracted by something else happening during the moment. And, unfortunately, when the moment is missed, it's gone forever.

Also, it's very difficult for people with vision problems to shoot and/or hunt. Often the target downfield, if shooting at the range, or the animal downfield, if hunting, is small because of the distance away from the shooter that they are typically located when the shot is fired.

Thus, there is a need for a sight-assist system that helps people with vision problems shoot and/or hunt, and that record a shooter's shot from the perspective of the shooter, not a third party, while still being able to sight through their own optics/scope.

SUMMARY

In one aspect of the invention, a system for assisting one's vision while aiming a firearm, includes a scope that is operable to capture light from an object downfield, and an optical collar that is operable to divert some or all of the light captured, and generate an image of the object. The scope has a first end and a second end. The first end captures light from the object located downfield from the first end, and looking through the second end, one receives the light captured by the first end, and generates an image of the object from the captured light. The optical collar includes a camera operable to generate an image from light that the camera receives, a beam-splitter optically aligned with the second end of the scope and operable to reflect a portion of the light captured by the scope's first end toward the camera, and a display operable to show the image generated by the camera from the light that the camera receives.

With the ability to divert some or all of the light captured by the scope's first end, one can record one's shots on the range and/or one's shots during a hunt from one's own perspective as the shooter. This allows one to more easily understand mistakes or errors that one makes while practicing his/her marksmanship on the range, and also allows a third party to see the shot on the display of the optical collar or on a display of another, separate viewing device that receives a transmission of the recording so that others can see and evaluate the shot. This also allows one to easily relive one's past hunting experience. And, with the ability to show the image of the target and/or animal downfield from the diverted portion of the captured light, one can aim his/her firearm via the display of the optical collar. This, in turn allows the image generated by the optical collar's camera to be manipulated, for example magnified, to allow a person with vision problems to safely and accurately shoot a firearm. This also allows one to aim a firearm without being in the downfield object's line of sight. Thus, one may shoot the firearm from a position around a corner without exposing one's face to the object/animal downfield.

In another aspect of the invention, a method for assisting one's vision while shooting a firearm, includes the following: 1) with a first end of a scope, capturing light from an object located downfield from the first end; 2) with a mirror, reflecting captured light toward a camera of an optical collar; 3) with the camera, generating an image of the object from the captured light reflected by the mirror; and 4) with a display of the optical collar, displaying the image of the object generated by the camera.

BRIEF DESCRIPTION OF THE DRAWINGS

FIG. 1A shows a perspective view of a system for assisting one's vision, according to an embodiment of the invention.

Figure 3B:
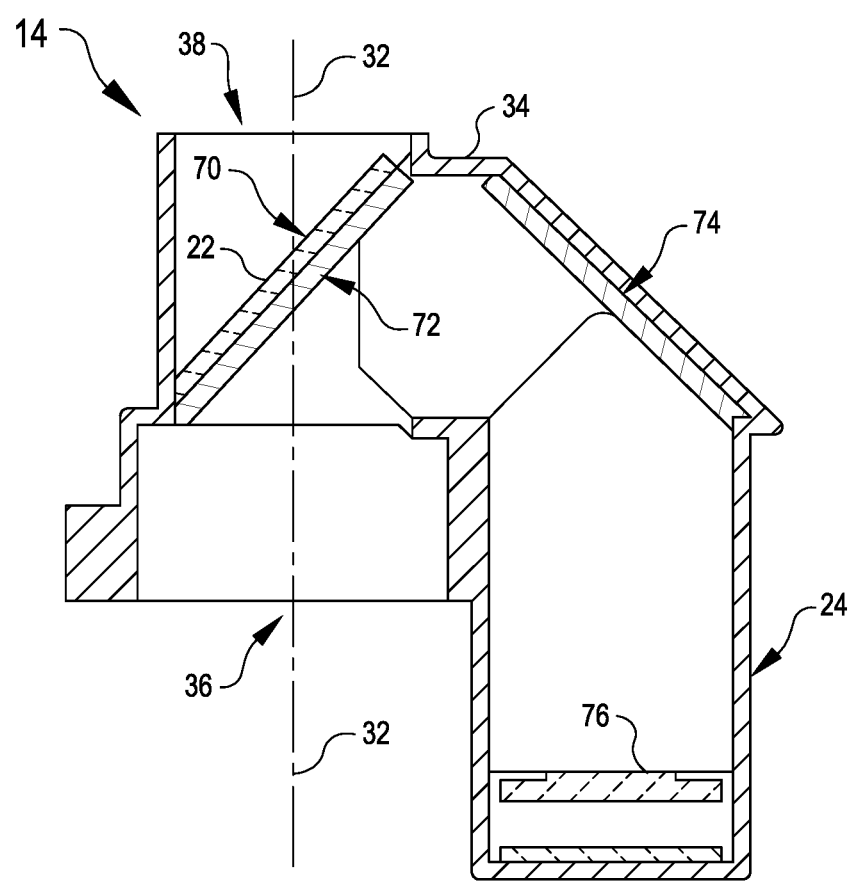

Each of FIGS. 3A and 3B shows a schematic view of an optical collar component of the system shown in FIG. 1A, each according to an embodiment of the invention.

Figure 4:
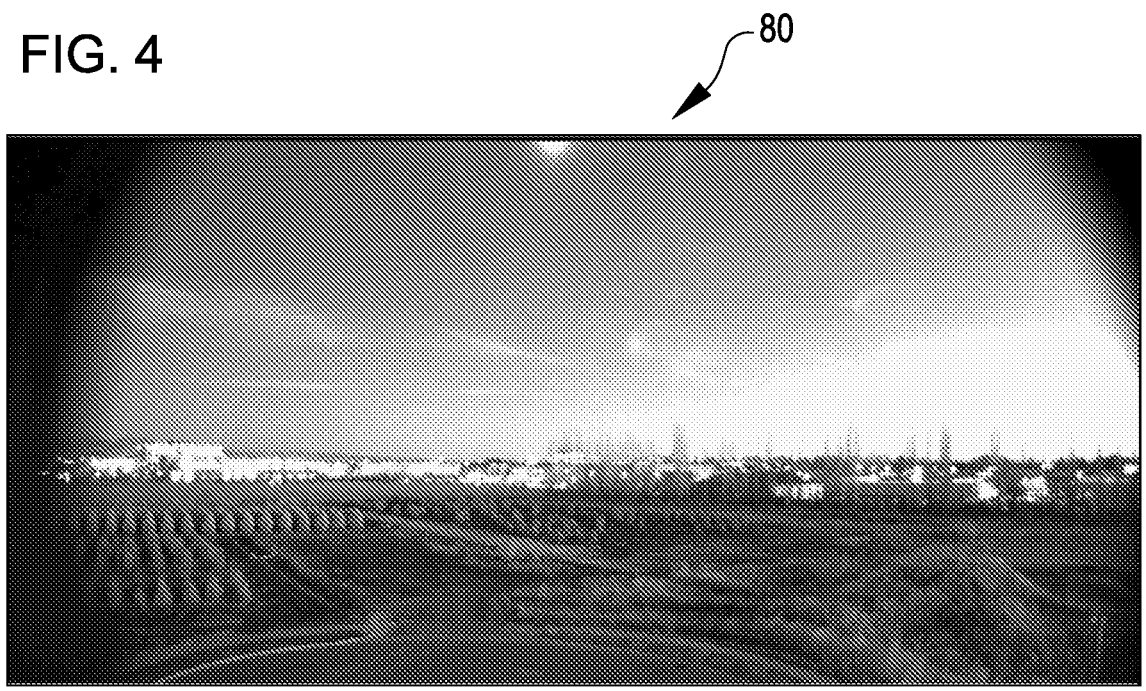

FIG. 4 shows an image generated and displayed by the system shown in FIG. 1A, according to an embodiment of the invention.

Figure 5:
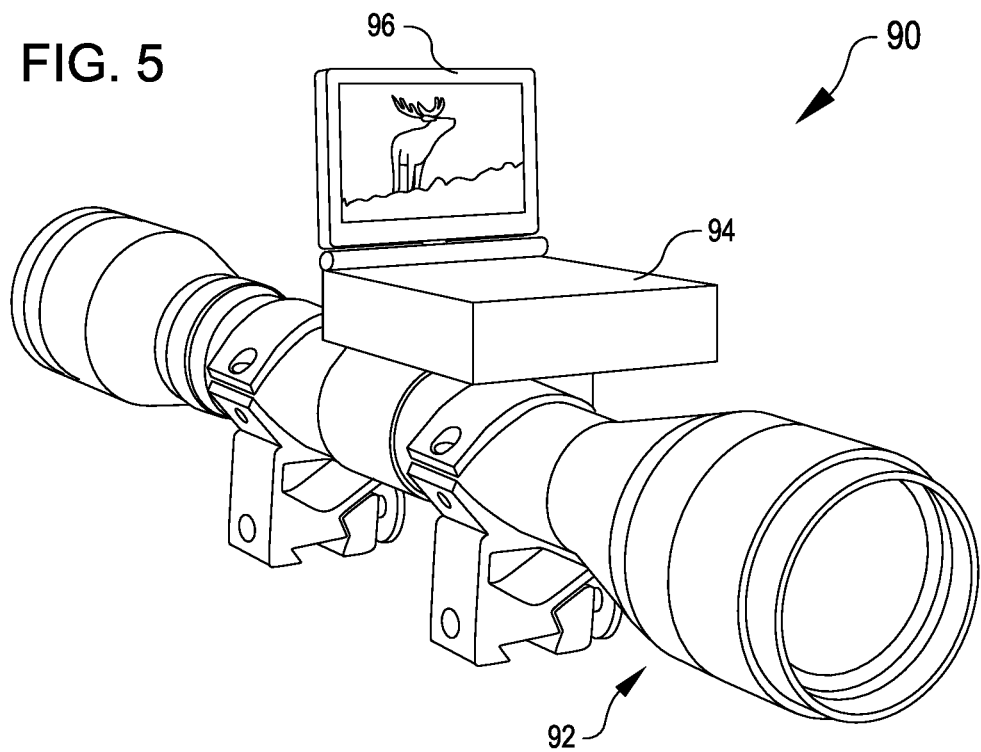

FIG. 5 shows a perspective view of a system for assisting one's vision, according to another embodiment of the invention.

DETAILED DESCRIPTION

Figure 1B:
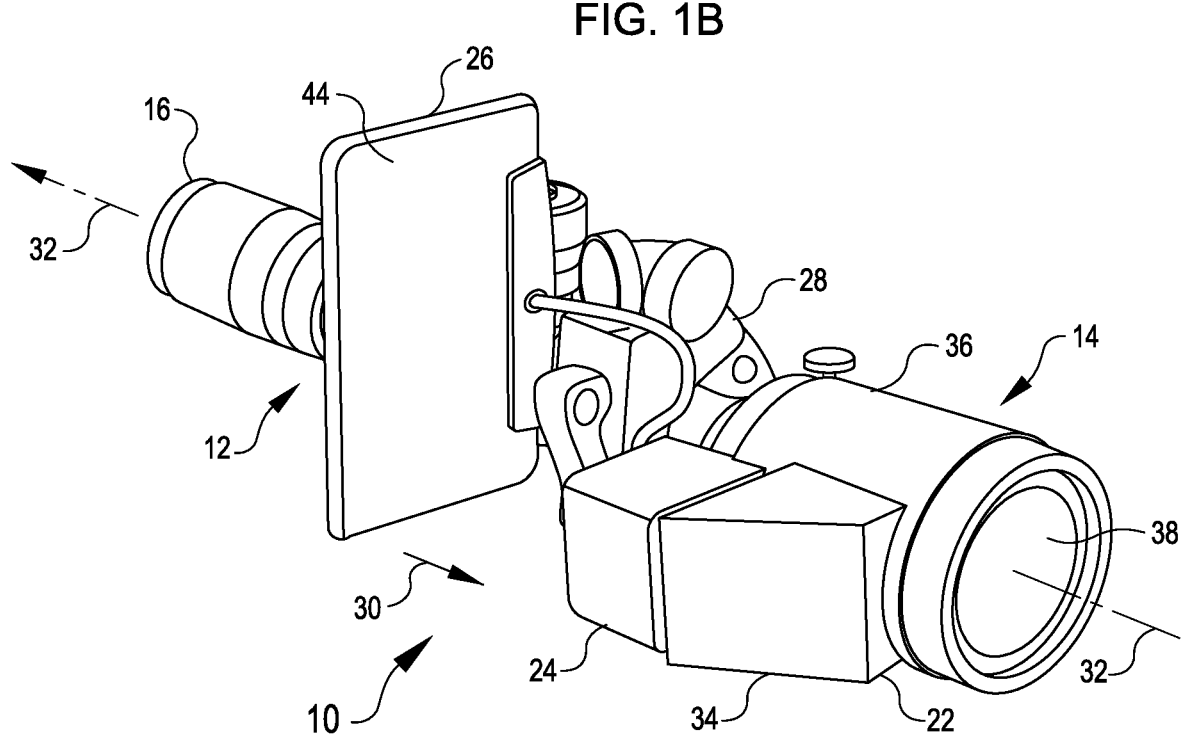
FIG. 1B shows another perspective view of the system shown in FIG. 1A, according to an embodiment of the invention.
Figure 1C:
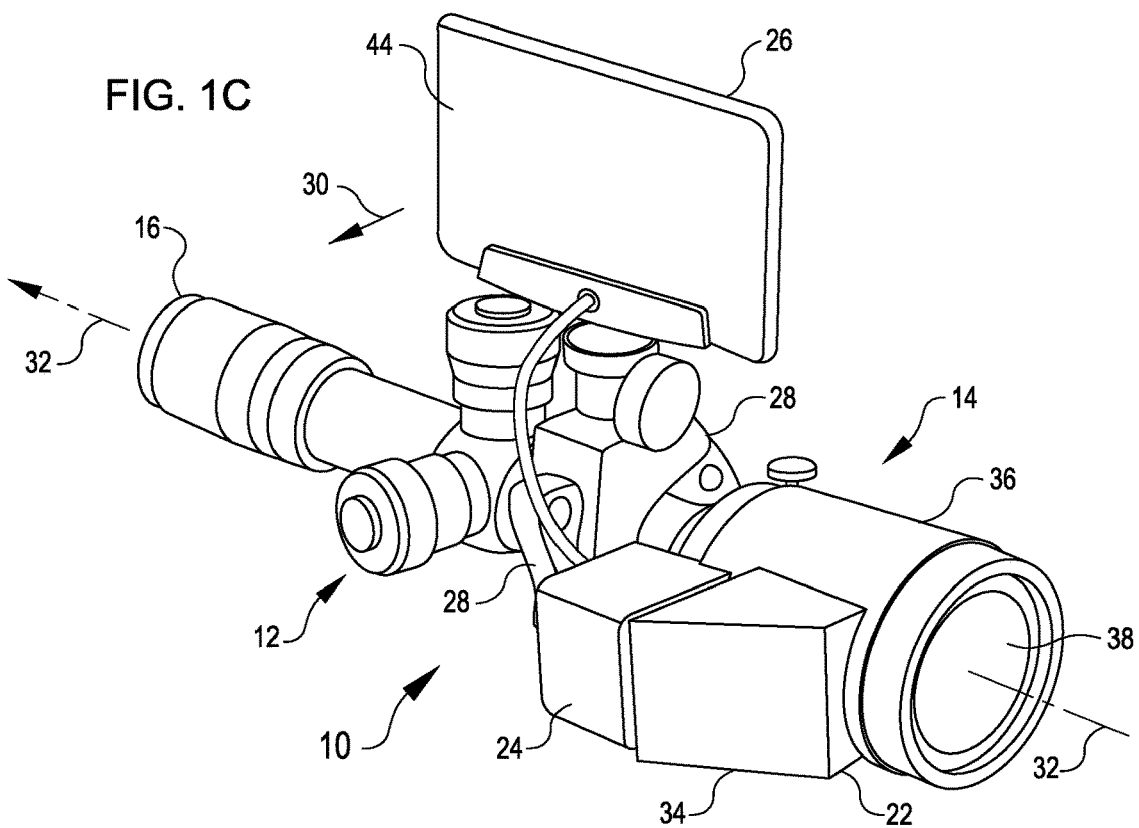
FIG. 1C shows yet another perspective view of the system shown in FIG. 1A, according to an embodiment of the invention.

Each of FIGS. 1A, 1B, and 1C shows a perspective view of a system 10 for assisting one's vision, according to an embodiment of the invention. The sight-assist system 10 includes a scope 12 and an optical collar 14, and may be mounted to any desired device. For example, in this embodiment the sight-assist system 10 may be mounted, via the scope 12, to a firearm (not shown), such as an assault rifle, a hunting or sporting rifle, a shotgun, or a pistol. The scope 12 captures light from an object that is located downfield from a first end 16 of the scope 12, in the direction indicated by the arrow 18, and projects the captured light to the second end (not shown, but surrounded by the optical collar 14) of the scope 12, where the optical collar 14 receives the captured light, and where one can view the object by looking into the second end. The optical collar 14 includes a beam-splitter 22, a camera 24, and a display 26. The beam-splitter 22 (discussed in greater detail in conjunction with FIGS. 3A and 3B) diverts all of or a portion of the captured light toward the camera 24. The camera 24 (also discussed in greater detail in conjunction with FIGS. 3A and 3B) coverts the diverted light into an electric signal that represents an image of the object downfield. And, the display 26 converts the electrical signal from the camera 24 into a visual display that one can see.

As shown in FIGS. 1A, 1B, and 1C, a mount 28 (discussed in greater detail in conjunction with FIG. 2) couples the display 26 with the scope 12 and allows the display 26 to be moved relative to the scope 12 to a variety of different positions. For example, as shown in FIG. 1A, the display 26 may be positioned such that a vector 30 that is normal to the display 26 is directed toward the second end of the scope 12 and lies above the scope 12. As shown in FIG. 1B, the vector 30 is again directed toward the second end, but in this position lies beside the scope 12. And, as shown in FIG. 1C, the vector 30 is directed away from the first end 16 and the second end of the scope. In other words, the display 26 shown in FIGS. 1A and 1B, is positioned such that the vector 30 lies parallel to the longitudinal axis 32 of the scope 12, and the display 26 shown in FIG. 1C is positioned such that the vector 30 is skewed relative to the longitudinal axis 32. Although each of the positions of the display 26 shown in FIGS. 1A, 1B, and 1C, show the display 26 in a position relative to the scope's longitudinal axis 32 in which the vector 30 does not intersect the longitudinal axis 32, the mount 28 also allows the display 26 to be moved relative to the scope 12 to a position where the vector 28 does intersect the longitudinal axis 32—i.e., tilted relative to the longitudinal axis 32.

With the ability to divert light captured by the scope's first end 16, one can record one's shots on the range and/or one's shots during a hunt from one's own perspective as the shooter. This allows one to more easily understand mistakes or errors that one makes while practicing his/her marksmanship on the range. This also allows one to easily relive one's past hunting experience. And, with the ability to show, via the display 26, the image of the target and/or animal downfield, from the diverted portion of the captured light, one can aim his/her firearm via the display 26 of the optical collar 14. If the camera 24 and/or display 26 includes the capability to modify the electrical signal representing an image of the downfield object, then a person with vision problems may use this capability to enhance the image of the object downfield to safely and accurately shoot a firearm. Showing, via the display 26, an image of an object downfield also allows one to aim a firearm without being in the downfield object's line of sight. Thus, one may shoot the firearm from a position around a corner without exposing one's face to the object/animal downfield.

Still referring to FIGS. 1A, 1B, and 1C, the scope 12 may be any desired device capable of capturing light. For example, in this and other embodiments, the system 10 includes a scope 12 that captures light in the visible spectrum of electromagnetic radiation—light having a wavelength between 380 and 750 nanometers. More specifically, the scope 12 includes a transparent lens (not shown) at the first end 16 through which light from an object downfield from the first end 16 travels through and is captured by the first end 16, and another transparent lens (also not shown) at the second end that one may look into to view the captured light and the image of the object downfield that the captured light comes from. The scope 12 is also a conventional scope that magnifies the image of the object downfield by manipulating the light from the object that it captures through its first end 16. In other embodiments, the scope 12 may reduce the image of the object downfield, or neither magnify nor reduce the image. In still other embodiments, the scope 12 may use a reflecting mirror to provide a second end that one looks into that is not colinear with the first end 16. In yet other embodiments, the scope 12 may capture light in one or more regions of the non-visible light spectrum. For example, the scope 12 may capture light in the infrared spectrum—light having a wavelength between 780 nanometers and 1 millimeter. For another example, the scope 12 may capture light in the ultraviolet spectrum—light having a wavelength between 100 and 400 nanometers.

The optical collar 14 may be configured as desired. For example, in this and other embodiments, the optical collar includes a body 34 that houses the beam-splitter 22 and camera 24. The body 34 includes a receiver 36 that receives the second end of the scope 12 and couples the body 34 to the scope's second end, and an eyepiece 38 that is optically aligned with the scope's second end and allows one to look through the scope's second end to view directly the light captured by the scope's first end. To secure the body 34 to the scope 12, the receiver 36 includes a universal coupling system 40 that one turns to frictionally engage the second end of the scope 12, and turns in the opposite direction to release the receiver 36 and allow one to remove the body 34 from the scope 12. The display 26 is coupled to the camera via the cable 42 which may or may not extend internally through the mount 42, and, as previously mentioned, separately coupled with the scope 12 via the mount 28. In this manner, the display 26 may be coupled with the scope 12 at locations that are not immediately adjacent the body 34 to further allow one to position the display 26 in positions that allow one to see an object downfield without being in the object's line of sight. Thus, if one is aiming a firearm at an opposing combatant, one can do so without exposing one's self to return fire. In other embodiments, the display 26 may be mounted to the body 34 of the optical collar 14 and coupled with the camera via a cable that extends internally through the body 34.

Still referring to FIGS. 1A, 1B, and 1C, the display 26 may be any desired display capable of converting the electrical signal from the camera 24 into a visual display that one can see. For example, in this and other embodiments, the display is a light emitting diode (LED) display that includes a processing unit (not shown) that has electronic circuitry for processing the video signal generated by the camera and displaying the signal as an image that a person can perceive, a display screen 44 to display the image, and a battery for powering the circuitry and display screen. The display 26 also includes software that the processing unit may execute to modify the electric signal generated by the camera and that represents the image of the object downfield, to modify the image. In this manner, the display 26 may improve the image of the object downfield to allow one that has vison problems to safely and accurately aim a firearm.

Other embodiments are possible. For example, as shown and discussed in greater detail in conjunction with FIG. 5, the system 10 may not include a beam-splitter and may have a laser with an infrared sensor to detect light from the laser that is reflected from the object downfield and back to the system 10 and/or infrared light generated by the downfield object's reaction to the laser. As another example, the system 10 may not include a scope 12, but rather may be mounted directly to a firearm. In such embodiments that also include a beam-splitter, the beam-splitter may be optically aligned with the peep sights of a fire arm when the system 10 is mounted to the fire arm. This may be desirable when shooting a shot gun and/or pistol.

Figure 2:
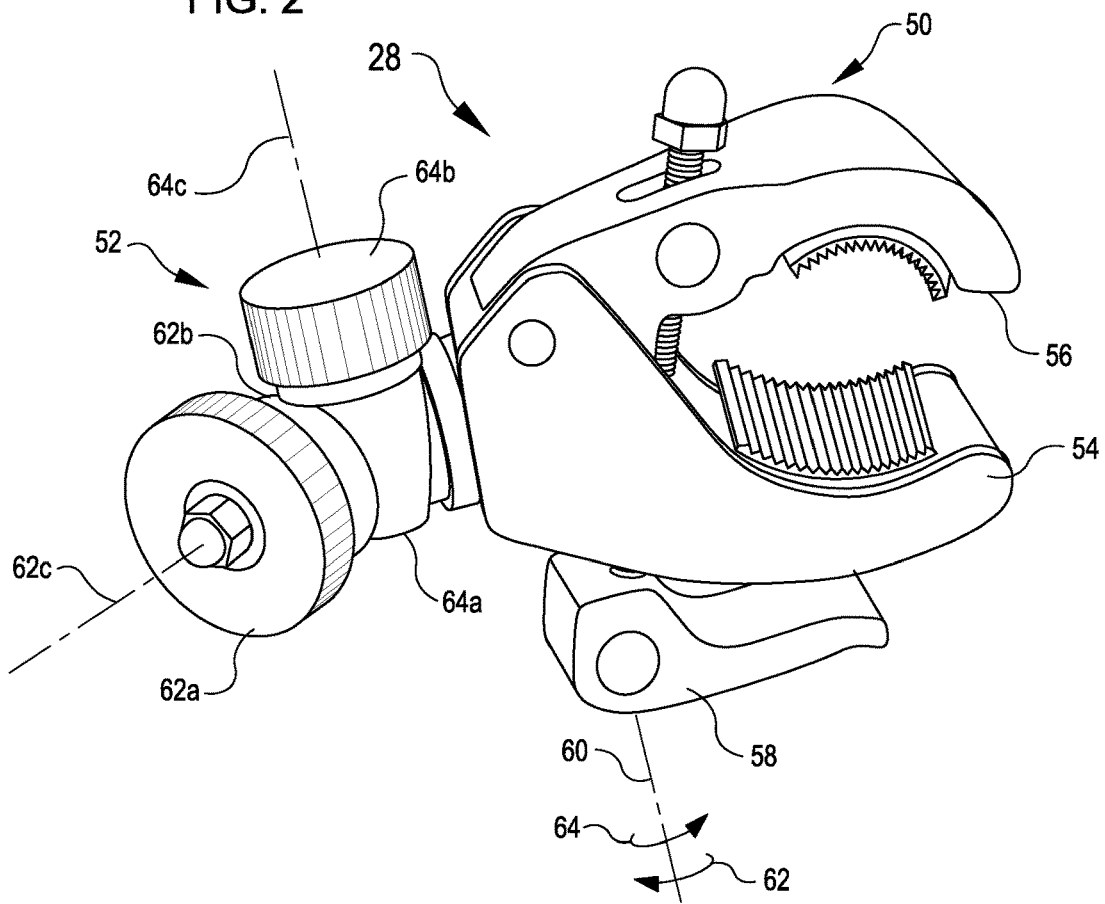
FIG. 2 shows a perspective view of a component for mounting a display of the system shown in FIG. 1A, according to an embodiment of the invention.

FIG. 2 shows a perspective view of the mount 28 for coupling the display 26 of the system 10 shown in FIG. 1A, according to an embodiment of the invention. As previously mentioned, the mount 28 couples the display 26 with the scope 12 and allows the display 26 to be moved to a variety of different positions relative to the scope 12.

The mount 28 may be configured as desired to provide this functionality. For example, in this and other embodiments, the mount 28 includes a clamp 50 that couples the mount 28 with the scope 12 (FIGS. 1A, 1B, and 1C), and a connector 52 that the couples the display 26 with the mount 28. More specifically, the clamp 50 includes a first jaw 54, a second jaw 56, and a cammed lever 58 that one rotates about the axis 60 to move the jaws 54 and 56 toward each other or apart. When the cam med lever 58 is rotated about the axis 60 in the direction indicated by the arrow 62, the jaws 54 and 56 move toward each other to clamp 50 onto the scope 12 (or any other structure, such as a barrel or a stock of a firearm). When the cam med lever 58 is rotated about the axis 60 in the direction indicated by the arrow 64, the jaws 54 and 56 move away from each other to release the clamp 50 from the scope 12 or other structure. In this manner, the mount 28 may be positioned and held at any location on the scope or other structure to facilitate the use of the system 10.

In this and other embodiments, the connector 52 includes a first hub 62 and a second hub 64, each of which has a first portion 62a and 64a, respectively, that rotates relative to a second portion 62b and 64b, respectively, about a respective one of the two axes 62c and 64c. The two axes 62c and 64c are orthogonal to each other to allow one to pitch the display 26 at any angle once the clamp 50 couples the connector 52 with and positions the connector 52 relative to the scope 12. To prevent the first portions 62a and 64a from rotating relative to their respective second portions 62b and 64b, each of the first portions 62a and 64a frictionally engages its respective second portion 62b and 64b.

Other embodiments are possible. For example, the clamp 50 may threadingly engage a screw or receiver located on the scope 12 to releasably couple the mount 28 with the scope. For another example, the connector 52 may include a hub 62 and/or 64 that translates (as opposed to rotates) relative to the clamp 50.

Each of FIGS. 3A and 3B shows a schematic view of an optical collar 14 of the system 10 shown in FIG. 1A, each according to an embodiment of the invention. As previously mentioned, the optical collar 14 includes the beam-splitter 22 that diverts all of or a portion of the light captured by the scope 12 toward the camera 24, and the camera 24 that coverts the diverted light into an electric signal that represents an image of the object downfield.

The beam-splitter 22 that may be any desired beam-splitter capable of providing this function. For example, in this and other embodiments, the beam-splitter 22 includes a plate 70 of low-iron glass that has a dielectric coating on one of its surfaces. The dielectric coating is selected and deposited on the surface in one or more layers to provide a ratio of reflectivity to transparency at or near 1.0—i.e., 50% of the light captured by the scope 12 and received by the beam-splitter 22 is reflected toward the camera and 50% of the captured light passes through the glass plate 70 and exits the optical collar's eyepiece 38. In other embodiments, the beam-splitter 22 may be designed to provide a ratio of reflectivity to transparency that is less than or greater than 1.0. In still other embodiments, the beam-splitter 22 may split the captured light into two orthogonally polarized light beams.

In this and other embodiments, the optical collar 14 includes the beam-splitter 22, a first mirror 72, and a second mirror 74. More specifically, the beam-splitter 22 is positioned in the body 34 of the optical collar 14 such that it lies at an angle of 45 degrees relative to the scope's axis 32. The second mirror 74 is similarly positioned in the body 34 of optical collar 14 except that the axis 32 does not intersect the second mirror 74, and the second mirror is symmetrical with the beam-splitter 22 about a plane that is parallel with the axis 32. In this position, the second mirror 74 receives the captured light reflected from the beam-splitter 22 and reflects the light toward the camera 24. The first mirror 72 is positioned between the beam-splitter 22 and the second mirror 74, and is moveable to a first position (shown in FIG. 3B), and to a second position (shown in FIG. 3A). In the first position, the first mirror 72 covers the beam-splitter 22 and blocks all of the light captured by the scope's first end from reaching the beam-splitter 22. In this first position, the first mirror 72 reflects all of the captured light toward the second mirror 74 and thus toward the camera 24. This prevents any of the captured light from exiting the optical collar's eyepiece 38 and thus allows the camera 24 to use all of the captured light to generate an electric signal of the object downfield. With this increase in resolution, the camera 22 and/or the display 26 may modify the electric signal generated by the camera to enhance one or more aspects of the image of the object downfield without substantially losing important detail in the image. In the second position, the first mirror 72 covers the second mirror 74 and allows all of the captured light to reach the beam-splitter 22. In this second position, the beam-splitter allows a portion of the captured light to pass through the plate glass 70 and exit the optical collar's eyepiece 38, and reflects another portion of the captured light toward the first mirror 72 and thus toward the camera 24. This allows the display 26 to simultaneously show the image that the shooter sees while the shooter looks through the scope 12 and thus one may record one's shots on the range and/or one's shots during a hunt from one's own perspective as the shooter.

Still referring to FIGS. 3A and 3B, the camera 24 may be configured as desired. For example, in this and other embodiments the camera 24 includes an image sensor 76 to convert the captured light received from either the first mirror 72 or the second mirror 74 into an electrical signal that can then be processed. More specifically, the image sensor 76 includes a complementary metal-oxide semiconductor (CMOS) sensor to convert the captured light into an electrical signal. The camera 24 also includes hardware and software to further process the electrical signal. The processing of the electrical signal may result in the image being magnified when shown by the display 26, or the processing may result in the image being made clearer or sharper in low-light conditions. In other embodiments, the image sensor 76 may include a charge-coupled device (CCD) sensor to convert the captured light into an electrical signal. With the CMOS and CCD sensors, near infrared light (wavelengths between 700-1200 nanometers) that is captured can be converted into an electrical signal and shown by display. In still other embodiments, the image sensor 76 may include light sensitive film that uses the captured light to produce a chemical reaction involving silver halide crystals on the film that can then be developed into a photograph. In yet other embodiments, the camera 24 may be releasably mounted in the optical collar 14 to allow one to easily use different cameras for different applications. For example, one can mount a high-definition, high speed movie camera to allow one to see the bullet leave the gun and make impact and then the next evening use an infrared camera.

FIG. 4 shows an image 80 generated and displayed by the system 10 shown in FIG. 1A, according to an embodiment of the invention. This image 80 was generated from light captured at dusk and then modified to enhance the visibility of the image. With this ability to modify the image, a person that has vision problems is able to use the system 10 to shoot and/or hunt.

FIG. 5 shows a perspective view of a system 90 for assisting one's vision, according to another embodiment of the invention. The sight-assist system 90 may be mounted to a scope 92 as shown in FIG. 5 or it may be mounted directly to a gun that does not include a scope, such as a shotgun or a pistol. The sight-assist system 90 is similar to the sight-assist system 10 in FIG. 1A, except that the system 90 does not include an optical collar. Instead, the system 90 includes a camera 94 and a display 96, and does not include a beam-splitter.

As previously mentioned, the camera 94 may be any desired camera that includes an image sensor to convert light captured by the camera 94 from an object downfield from the camera 94 into an electrical signal that can then be processed. For example, in this and other embodiments, the camera 94 is configured to receive and convert light in the infrared spectrum into an electric signal that the display 96 can then show. Targets downfield that do generate electromagnetic radiation in the infrared spectrum, can be sensed by the camera 94 and then shown by the display 96. In other embodiments, the camera 94 may also include an infrared generator such as an infrared laser to allow one to identify targets downfield that do not generate infrared radiation themselves but do reflect it when exposed to it.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A system for assisting one's vision while aiming a firearm, the system comprising:
    a scope having a first end and a second end, and operable to capture light, wherein the first end captures light from an object located downfield from the first end, and one looks through the second end to receive the captured light and generate an image of the object from the captured light; and
    an optical collar that includes:
        a camera operable to generate an image from light that the camera receives,
        a beam-splitter optically aligned with the second end of the scope and operable to reflect a portion of the light captured by the first end of the scope toward the camera,
        a mirror that is moveable to a first position in which the mirror prevents the light captured by the scope's first end from reaching the beam-splitter, and reflects the light toward the camera, and
        a display operable to show the image generated by the camera from the light that the camera receives.

2. The system of claim 1 wherein the first end includes a transparent lens.

3. The system of claim 1 wherein the second end includes a transparent lens.

4. The system of claim 1 wherein the scope includes a longitudinal axis that passes through the first end and the second end such that the first end and the second end are colinear.

5. The system of claim 1 wherein the scope manipulates the light captured by the first end to magnify the size of the object located downfield from the first end.

6. The system of claim 1 wherein the optical collar is releasably mounted to the scope at the scope's second end.

7. The system of claim 1 wherein the camera includes a charge-coupled device (CCD) sensor to convert the captured light that the camera receives into an electrical signal.

8. The system of claim 7 wherein the camera includes a complementary metal-oxide semiconductor (CMOS) sensor to convert the captured light that the camera receives into an electrical signal.

9. The system of claim 1 wherein the mirror is double-sided.

10. The system of claim 1 wherein the optical collar includes a mirror that is moveable to a second position in which the mirror receives the portion of the light that is captured by the scope's first end and reflected from the beam-splitter toward the camera, and reflects the portion of the light toward the camera.

11. The system of claim 1 wherein the camera is operable to modify the image that it generates from the light that it receives, to enhance the image.

12. The system of claim 1 wherein the display is moveable relative to the scope to allow one to view an object downfield from the first end of the scope without being in the object's line of vision.

13. A method for assisting one's vision while shooting a firearm, the method comprising:
    with a first end of a scope, capturing light from an object located downfield from the first end;
    with a mirror reflecting captured light toward a camera of an optical collar, wherein reflecting the captured light includes moving the mirror relative to the camera to:
        a first position to prevent light captured by the scope's first end from reaching a beam-splitter of the optical collar, and
        to a second position to allow light captured by the scope's first end to reach the beam-splitter, and to receive the portion of the captured light reflected from the beam-splitter and reflect toward the camera the portion of the captured light from the beamsplitter;

with the camera, generating an image of the object from the captured light reflected by the mirror;

with a display of the optical collar, displaying the image of the object generated by the camera.

14. The method of claim 13 wherein capturing the light from an object downfield includes the light passing through a transparent lens.

15. The method of claim 13 wherein reflecting captured light includes reflecting a portion of the captured light with a beam-splitter of the optical collar.

16. The method of claim 13 wherein reflecting captured light includes reflecting substantially all of the captured light with the mirror.

17. The method of claim 13 wherein generating an image includes modifying the image to enhance the image.

18. The method of claim 13 wherein displaying the image of the object downfield includes moving the display relative to the scope such that the image of the object downfield may be viewed from a location that is outside of the object's line of vision.

19. The method of claim 13 further comprising looking through a second end of the scope to receive captured light that has not been reflected by the mirror, and aiming the firearm.

20. The method of claim 13 further comprising looking at the display of the optical collar to aim the firearm.

21. A firearm comprising:
a barrel operable to direct a fired bullet;
a scope mounted to the barrel, the scope having a first end operable to capture light from an object located downfield from the barrel, and a second end operable to view light captured by the first end and aim the barrel; and
an optical collar coupled with the scope, wherein the optical collar includes:
   a camera operable to generate an image from light that the camera receives,
   a beam-splitter optically aligned with the second end of the scope and operable to reflect a portion of the light captured by the first end of the scope toward the camera,
   a mirror that is moveable to a first position in which the mirror prevents the light captured by the scope's first end from reaching the beam-splitter, and reflects the light toward the camera, and
   a display operable to show the image generated by the camera from the light that the camera receives.

22. The firearm of claim 21 wherein the optical collar is releasably coupled to the scope.

23. The firearm of claim 21 wherein the barrel has a longitudinal axis, and the display is operable to show the object downfield from the barrel to a person looking across the longitudinal axis of the barrel.

* * * * *